United States Patent
Benson et al.

(10) Patent No.: US 9,216,771 B2
(45) Date of Patent: Dec. 22, 2015

(54) HOOD STRUCTURE FOR AUTOMOTIVE VEHICLE

(71) Applicant: Toyota Motor Engineering & Manufacturing North America, Inc., Erlanger, KY (US)

(72) Inventors: Blaine C. Benson, Ann Arbor, MI (US); Mark D. Clauser, Saline, MI (US); Min Zhu, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 105 days.

(21) Appl. No.: 14/020,125

(22) Filed: Sep. 6, 2013

(65) Prior Publication Data

US 2015/0069786 A1    Mar. 12, 2015

(51) Int. Cl.
*B62D 25/10* (2006.01)
*B60R 21/00* (2006.01)

(52) U.S. Cl.
CPC .............. *B62D 25/105* (2013.01); *B60R 21/00* (2013.01)

(58) Field of Classification Search
CPC ................ B62D 25/105; B62D 25/12; B60R 2021/0004
USPC ............ 296/195.11, 187.09, 19.11; 180/69.2, 180/69.21
See application file for complete search history.

(56) References Cited

U.S. PATENT DOCUMENTS

| | | | |
|---|---|---|---|
| 4,579,185 A | 4/1986 | Wakasa | |
| 5,197,560 A | 3/1993 | Oda et al. | |
| 5,476,151 A | 12/1995 | Tsuchida et al. | |
| 6,048,022 A | 4/2000 | Ishibashi et al. | |
| 6,179,364 B1 * | 1/2001 | Takahashi | 296/76 |
| 6,938,715 B2 | 9/2005 | Hamada et al. | |
| 7,052,075 B2 | 5/2006 | Kamada et al. | |
| 7,090,289 B2 | 8/2006 | Koura | |
| 7,195,090 B2 | 3/2007 | Parks et al. | |
| 7,354,101 B2 | 4/2008 | Donabedian et al. | |
| 2005/0280287 A1 * | 12/2005 | Koura | 296/193.11 |
| 2007/0132279 A1 * | 6/2007 | Donabedian et al. | 296/193.11 |
| 2008/0122261 A1 * | 5/2008 | Seo | 296/193.11 |
| 2014/0015285 A1 * | 1/2014 | Ishitobi et al. | 296/193.11 |

FOREIGN PATENT DOCUMENTS

JP    2008149762 A  *  7/2008

* cited by examiner

*Primary Examiner* — Jason S Morrow
(74) *Attorney, Agent, or Firm* — Dinsmore & Shohl LLP

(57) ABSTRACT

A panel for a vehicle. The panel includes an outer panel and an inner panel. The outer panel has an exterior surface and an underside surface, and the inner panel is located adjacent to and along the underside surface of the outer panel, but spaced apart from the outer panel. The inner panel also exhibits a bow over a substantial portion of its length, with the bow being in a direction toward the outer panel. The bow induces a moment in the inner panel during impact of the vehicle in a collision that causes the inner panel and, resultantly, the outer panel to undergo a predetermined deformation in an upward direction relative to the vehicle. The panel may be provided as the hood of the vehicle.

17 Claims, 3 Drawing Sheets

HOOD STRUCTURE FOR AUTOMOTIVE VEHICLE

BACKGROUND

1. Field of the Invention

The present invention generally relates to hoods for automotive vehicles. More specifically, the invention relates to a hood structure that controls deformation of the hood during a collision.

2. Description of Related Art

Automotive vehicles are designed so that during a frontal impact, various portions of the vehicle will absorb the impact and protect the occupants of the vehicle. One portion that absorbs part of the impact is the hood. In designing a hood to absorb part of a frontal impact, the hood must be designed so that, during a frontal impact, it does not deform in a manner that causes the hood to impinge upon the passenger compartment of the vehicle. In this regard, hoods are generally designed to deform upwardly relative to the vehicle.

Often hoods are designed having a smooth exterior contour to provide a pleasing visual appearance. A recent trend in automotive vehicle design, however, has been to provide the hood with more contour changes and pronounced styling. Such contour changes and styling have an impact on the deformation characteristics of the hood. If pronounced enough, the styling makes it difficult to design the hood so that it will deform in the desired manner during a frontal impact. In fact, the styling may be so pronounced that the styling prevents the hood from deforming upwardly utilizing known techniques for imparting such a predetermined deformation.

SUMMARY

In satisfying the above need, as well as overcoming the enumerated drawbacks and other limitations of the related art, in one aspect the invention provides a panel for a vehicle in which the panel has an outer panel and an inner panel. The outer panel includes an exterior surface and an underside surface, and the inner panel is located adjacent to and along the underside surface of the outer panel. The inner panel is also spaced apart from the outer panel and exhibits a bow over a substantial portion of its length. The bow is provided in a direction toward the outer panel and induces a moment in the inner panel, during impact of the vehicle in a collision, that causes the inner panel and, resultantly, the outer panel to undergo a predetermined deformation in an upward direction relative to the vehicle.

In another aspect, the outer panel and the inner panel cooperate to define a first distance, a second distance and a third distance along a length of the panel. The first distance is defined at a first location toward one end of the inner panel; the second distance is defined at a second location along the inner panel; the third distance is defined at a third location toward the other end of the inner panel; the second location is between the first and third locations; and the second distance is less than the first and third distances.

In a further aspect, the second location is provided in a middle region along the longitudinal length of the inner panel.

In an additional aspect, the bow of the inner panel defines a plurality of second locations that are defined along a line that is oriented perpendicular to a longitudinal direction defined by the vehicle.

In yet another aspect, the inner panel includes a plurality of ribs extending in the longitudinal direction defined by the vehicle, and each of the ribs exhibits the bow toward the outer panel.

In still a further aspect, the inner panel includes at least one rib extending in a longitudinal direction defined by the vehicle, and the rib exhibits the bow toward the outer panel.

In an additional aspect, a beam extends perpendicularly to and intersects with the rib.

In still another aspect, the intersecting of the rib and the brace is at a location along the rib that defines the shortest distance between the bow and the outer panel.

In yet a further aspect, the panel is a hood of the vehicle.

In an additional aspect, the predetermined deformation is an inverted V-shape.

In another aspect, the invention provides a panel for a vehicle, wherein the vehicle defines a longitudinal direction and the panel includes an outer panel and an inner panel. The outer panel has an exterior surface and an underside surface, and the inner panel is located adjacent to and along the underside surface of the outer panel. The inner panel is spaced apart from the outer panel with, in the longitudinal direction, the inner panel sloping toward the outer panel from a first location to a second location and sloping away from the outer panel from the second location to a third location. The first and third locations are positioned toward opposite ends of the inner panel, and the second location is between the first and third locations. The sloping of the inner panel toward the outer panel induces a moment in the inner panel at the second location that, during impact of the vehicle, causes the inner panel and, resultantly, the outer panel to undergo predetermined deformation in an upward direction relative to the vehicle.

In another aspect, sloping of the inner panel toward and away from the outer panel occurs over a substantial portion of the length of the inner panel.

In a further aspect, the inner panel has a central portion defined inward of its periphery, and the sloping of the inner panel is provided in the central portion and over a majority of the length of the central portion.

In an additional aspect, the central portion includes a plurality of ribs extending in the longitudinal direction, and the sloping of the inner panel is defined along at least one of the ribs.

In still another aspect, the sloping of the inner panel is defined along all of the ribs.

In yet a further aspect, the sloping of the inner panel is defined by a smoothly curved portion of the inner panel.

In an additional aspect, the sloping of the inner panel is defined by a straight portion of the inner panel.

In yet another aspect, the second location is centrally located along the length of the panel.

Further objects, features and advantages of this invention will become readily apparent to persons skilled in the art after a review of the following description, with reference to the drawings and claims that are appended to and form a part of this specification.

DETAILED DESCRIPTION

With increased and more pronounced styling in the hoods of automotive vehicles, it has become more difficult to construct a hood that will deform in a controlled manner during a frontal impact. Preferably, the hood's construction is such that the hood will not be driven rearward during a frontal impact so as to cause the hood to impinge upon the passenger cabin. Rather, it is preferred that the hood deform upwardly into a triangular or inverted V-shape, during such an impact.

With increased styling in the hood, the hood resists deformation. During a frontal impact, the hood becomes loaded in compression between the fixed points of the hood latch, located at the front of the vehicle, and the hinge mounting of the hood, located generally in front of the passenger cabin near the A-pillars of the vehicle. If this loading of the hood is not relieved in a controlled manner, the hood may move rearward during the frontal impact and cause some impingement upon the passenger cabin.

Figure 1:
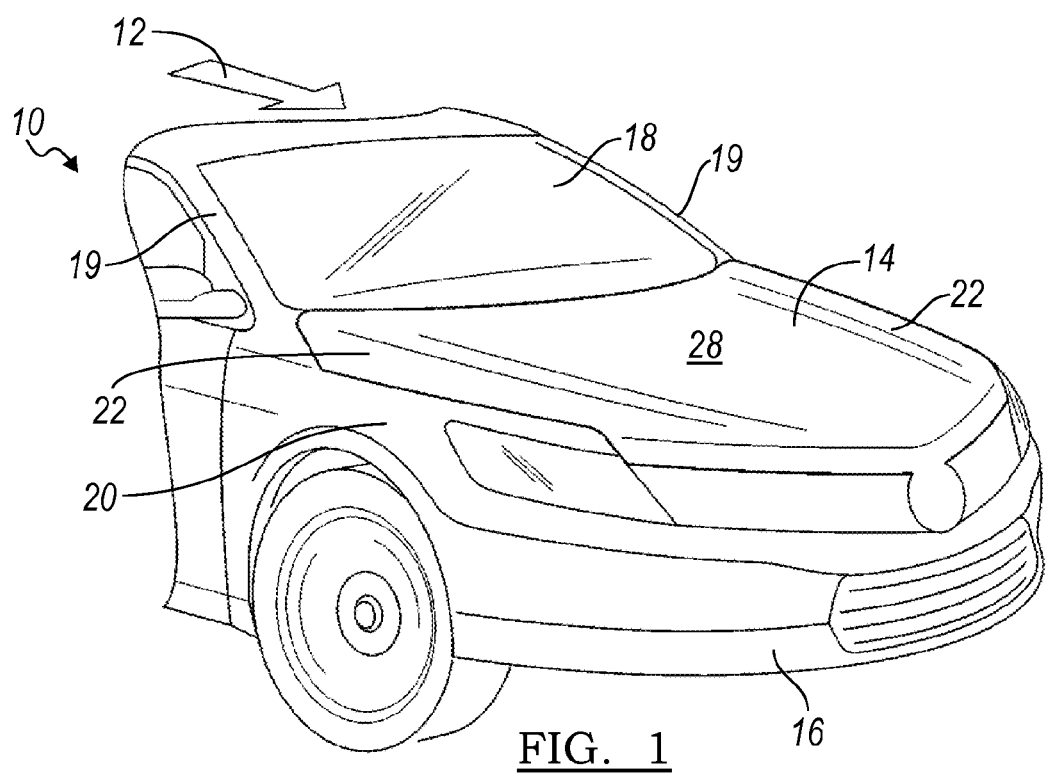
FIG. 1 is a partial perspective view of an automotive vehicle with a hood incorporating the principles of the present invention.

Referring now to the drawings, a vehicle embodying the principles of the present invention is illustrated in FIG. 1 and designated at 10. The vehicle 10 defines a longitudinal direction or axis, designated along arrow 12, which is generally in the forward-rearward direction of the vehicle. During a frontal impact, the vehicle 10 collides with an object generally, but most often not exactly, in this longitudinal direction. Accordingly, as used herein, the term longitudinal does not mean precisely along the longitudinal axis, but is also intended to encompass directions oblique to the longitudinal axis up to about 45° to either side thereof. Also, while the present invention is discussed in connection with a frontal impact, it will be appreciated that present invention also has applicability with panels that may be impacted in directions other than via a frontal impact of the vehicle. In this regard, the impact is to be considered relative to the construction of the panel and the context of its implementation. For example, the panel may be incorporated into an object so as to react to an impact that is not directed longitudinally relative to the object, but that is directed in the intended direction of compressive loading of the panel.

As seen in FIG. 1, the vehicle 10 includes a panel 14 that extends so as to cover the engine compartment of the vehicle 10. The panel 14, which is illustrated as the hood of an automotive vehicle 10, is generally bounded on the front by the front bumper 16, on the rear by the windshield 18 and A-pillars 19, and on the left and right sides by the front quarter panels or fenders 20 (of which only the right front quarter panel 20 is shown). If the vehicle 10 is of the variety not having a front engine, then the panel 14 is still generally located in the same position, but overlies a storage compartment or other feature of the vehicle. Stylistically, almost all automotive vehicles have hoods located in the front of the vehicle. Hereafter, and without being limited thereto, the panel 14 will be referred to as hood 14, so as to be consistent with the illustrated embodiment.

Figure 2:
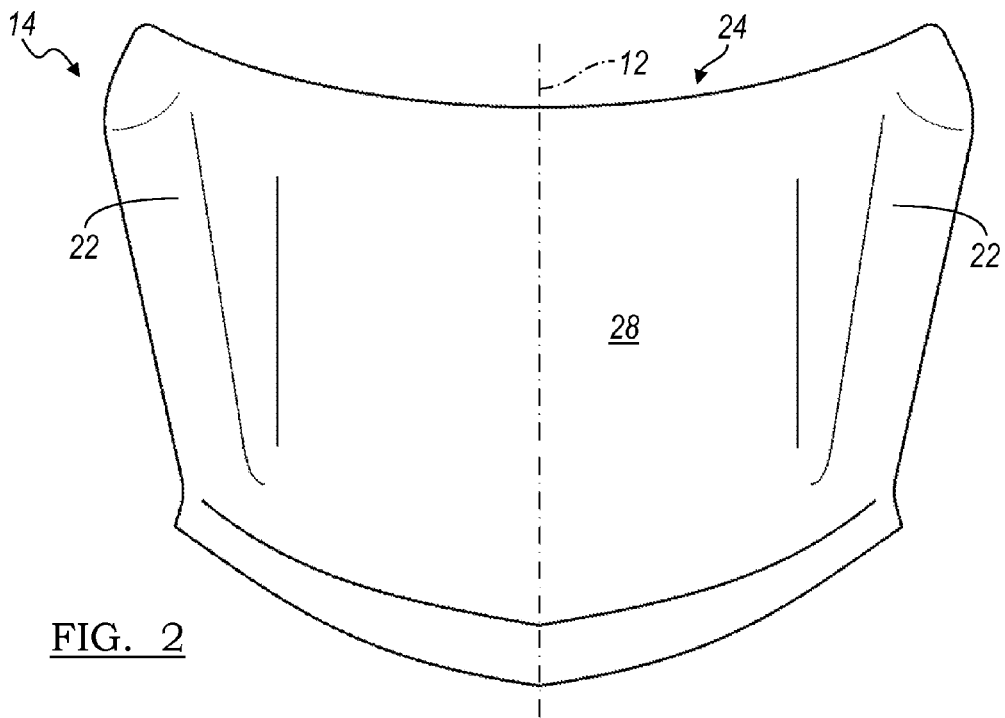
FIG. 2 is a top plan view of the hood seen in FIG. 1, particularly showing the outer panel of the hood.

The hood 14 to which the present invention has particular applicability is one that has pronounced styling therein. What is meant by pronounced styling is that the hood 14 either has numerous features or surface height changes across its length and/or width or has relatively large surface height changes. While applicable to hoods with pronounced styling, the invention can also be utilized in conjunction with hoods having minimal or substantially no styling other than smooth and subtle surface contour changes. In FIGS. 1 and 2, the pronounced styling is generally designated at 22 and is represented by a significant height change on the left and right sides of the hood 14, those height changes extending substantially over the length of the hood 14.

Figure 3:
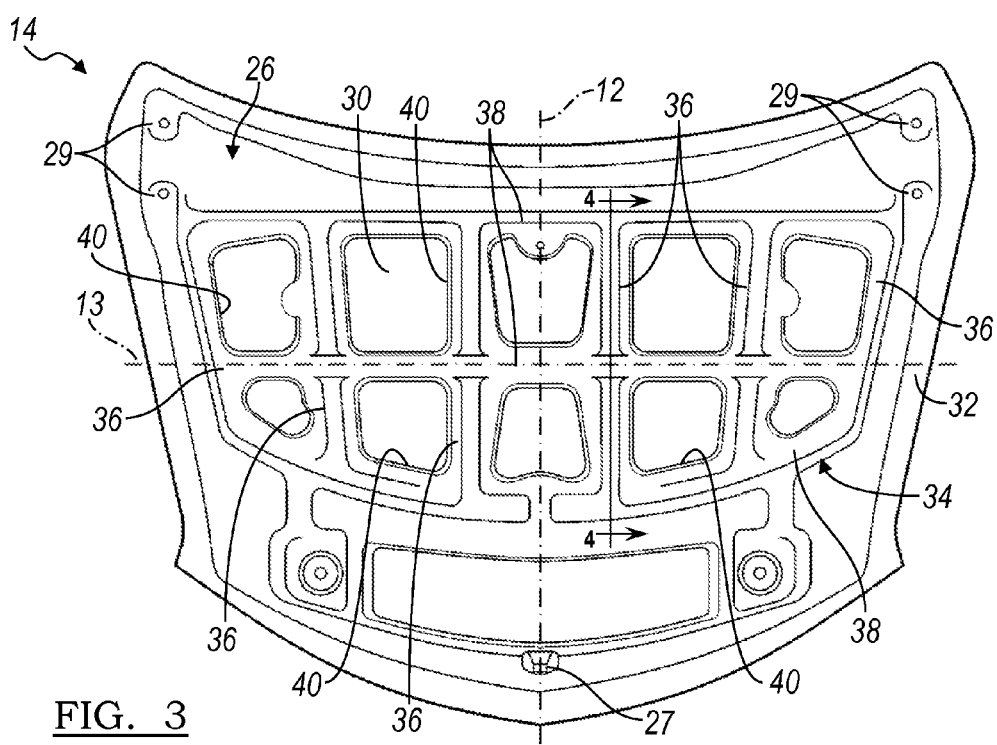
FIG. 3 is a bottom plan view of the hood seen in FIGS. 1 and 2, particularly showing the inner panel of the hood.
Figure 4:
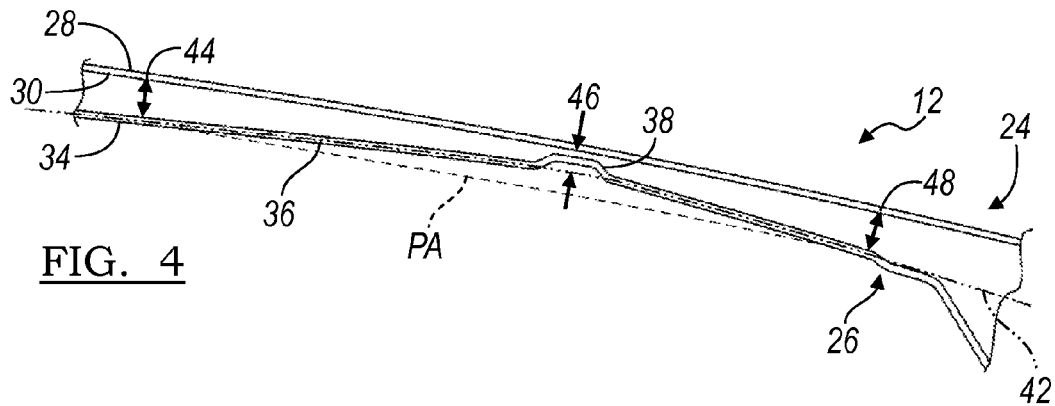
FIG. 4 is a cross sectional view, generally taken along line 4-4 seen in FIG. 3.

Referring now to FIGS. 2, 3 and 4, the hood 14 includes an outer panel 24 and an inner panel 26. The outer panel 24 has an exterior surface 28, which is the viewable surface of the hood 14 when the hood 14 is mounted to the vehicle 10 in its normal operational position (seen in FIG. 1). The outer panel 24 also includes an underside surface 30 that is coextensive with the exterior surface 28. The underside surface 30 is partially visible in FIG. 3, but is readily identifiable in FIG. 4.

The inner panel 26, which is best seen in FIGS. 3 and 4, is substantially coextensive with the outer panel 24 and is attached to the outer panel 24 about its perimeter. This attachment may be achieved by way of a variety of well-known mechanisms. Without being limited thereto, one such mechanism includes the folding over of a peripheral flange 32 of the outer panel 24 about a peripheral edge (not shown) of the inner panel 26, and welding the peripheral flange 32 to the inner panel 26. To secure the hood 14 to the vehicle 10, the hood 14 also includes a front latch 27 and hinge mountings 29.

Inwardly of its peripheral edge, the inner panel 26 includes a central portion 34 that extends over a substantial portion of the length and width of the inner panel 26. Part of the central portion 34, or the entire central portion 34, may include a series of ribs 36 and braces 38 between which are defined a series of openings 40 in the inner panel 26. For the sake of clarity, only some of the openings 40 are designated in FIG. 3. The ribs 36 extend in a direction that is generally parallel to the longitudinal direction 12, while the braces 38 extend in a direction that is transverse or generally perpendicular to the longitudinal direction 12. In the illustrated embodiment, six ribs 36 and three braces 38 are provided in the central portion 34. Depending on the particular design of the hood 14, a greater or lesser number of ribs 36 or braces 38 may be provided. In a further alternative, the ribs 36 and braces 38 may be omitted from the central portion 34, with the central portion 34 being defined by a continuous sheet of metal. Also alternatively, the openings 40 defined between the ribs 38 and braces 40 may be omitted and replaced by a planar sheet portion of the central portion 34 extending therebetween.

The inner panel 26, and more particularly the central portion 34 thereof, is provided adjacent to the underside surface 30 of the outer panel 24 and is spaced apart therefrom. As seen in FIG. 4, the central portion 34, and more particularly the ribs 36, exhibit a pre-bend or bow 42 over a majority of its length such that the central portion 34 bows or bends in a direction toward the outer panel 24. The bow 42 is generally delineated as a smooth curved line, defined through or along a central axis of the central portion 34, sloping toward then away from the outer panel 24. As such, the bow 42 is not necessarily defined as a surface of the central portion 34, it being understood that the surface of the central portion 34 may have localized areas and features that deviate from the general nature of the bow 42.

Moving longitudinally along a length of the central portion 34 that is defined parallel to the longitudinal direction 12, from left to right in FIG. 4, the bow 42 varies the spacing of the central portion 34 from the outer panel 24. Thus, at a rearward or first location along a length of the central portion 34, a first distance 44 is defined between the central portion 34 and the outer panel 24. Toward the middle of the length, a second location defines a second distance 46 between the bow 42 and the outer panel 24. Finally, at a forward or third location along the length, a third distance 48 is defined between the central portion 34 and the outer panel 24. Of the first, second and third distances 44, 46, 48, the second distance 46 is the smallest and represents the closest that the bow 42 of the central portion 34 approaches the outer panel 24. The location (the second location) defining the second distance 46, is preferably at the middle or in a middle region of the hood 14, as further discussed below, and is located along a line 13 that is perpendicular to the longitudinal direction 12. The dimension of the second distance 46 is not defined herein since it may depend on the particular design of the hood 14. However, it is noted that the second distance 46 may be about zero, with the central portion 34 contacting the outer panel 24 at this location.

When the central portion 34 is provided with the ribs 36 and braces 38, the bow 42 extends along the ribs 36 in a direction generally parallel to the longitudinal direction 12. The ribs 36 therefore exhibit a bowed shape toward the outer panel 26. The second distance 46, in this construction, may occur at the location where the ribs 36 intersect with the braces 38, as seen in FIG. 4. More specifically, as shown in FIG. 4, the intersection of the rib and the brace and a centerline of a longitudinal length of the brace are at a location along the rib that defines the shortest distance between the bow and the outer panel.

Both the ribs 36 and braces 38 may be provided with a cross-sectional shape that defines a recess or channel; one such channel is illustrated in FIG. 4 in connection with the brace 38. A recess or channel, however, is in contradistinction to the bow 42 described herein. The bow 42 is generally provided along the entire length of the central portion 34, or a majority or substantial portion of the length. A substantial portion of the length, as used herein, is at least a quarter of the length of the central portion 34 or the inner panel 26.

During a frontal impact, the hood 14 is loaded in compression, generally between the fixed points of the front latch 27 and hinge mountings 29. Additionally, the styling 22 of the outer panel 24 operates to strengthen the outer panel 24 and prevent it from easily deforming during the impact. During a frontal impact, however, it is designed that the hood 12 deform in a generally controlled or predetermined manner.

The desired predetermined deformation is one that limits rearward movement of the hood 14. Since the engine limits the ability of the hood 14 to deform downwardly, the predetermined deformation is further one that causes an upward movement of the hood 14 during deformation. Additionally, to further prevent rearward movement of the hood 14 during the impact, the predetermined deformation is one that generally assumes an inverted V-shape or triangular shape. Various shapes are not preferred, such as rectangular or trapezoidal, since these shapes define surfaces generally directed in the longitudinal direction, which would tend to move the hood 14 toward the passenger cabin during a frontal impact.

Figure 5:
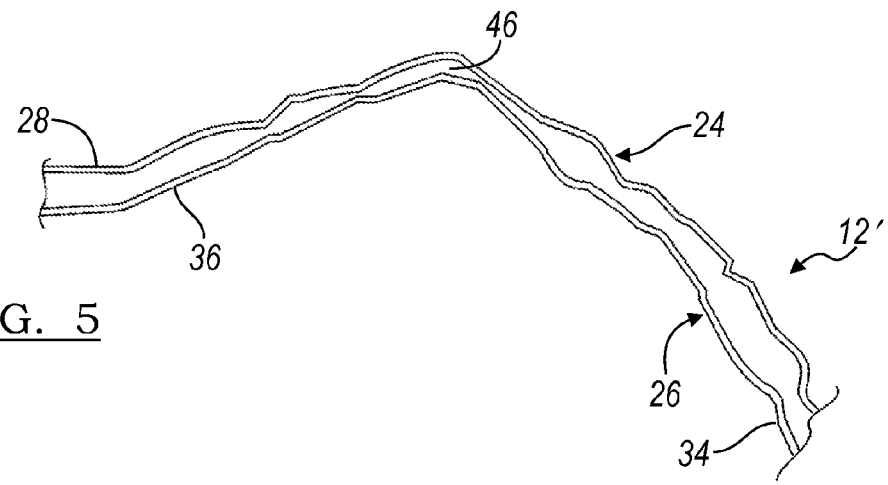
FIG. 5 is cross sectional view, similar to FIG. 4, generally showing the hood after deformation during a collision.

As noted above, with the styling 22, the outer panel 24 resists deformation and is compressively loaded. The shape of the inner panel 26, however, operates to define a moment acting through the location of the second distance 46. Since the located that defines the second distance 46 is not along a line drawn between the latch 27 and hinge mountings 29, and is instead off-set toward the outer panel 24 as a result of the bow 42, this moment acts in an upward direction relative to the vehicle 10. Upon a frontal impact, the induced moment immediately causes the inner panel 26 to deform upwardly at the location defining the second distance 46. With the outer panel 24 being compressively loaded, contact from the inner panel 26 provides an upward force acting on the outer panel 24. This upward force alters the compressive forces acting on the outer panel 24, inducing an upward component into those forces, which in turn overcomes the compressive forces and initiates an upward deformation of the outer panel 24 with the inner panel 26. As a result, the hood 14 deforms in the predetermined manner, which is upward (relative to the vehicle 10) at the general location of the second distance 46, with the deformed hood 14', seen in FIG. 5, taking on the triangular or inverted V-shape mentioned above.

As a point of reference, FIG. 4 identifies at PA an inner panel that is generally parallel to the outer panel 24. By incorporating the bow 42, the present invention disposes the location defining the second distance 46 closer toward the outer panel 24. This reduced distance results in the induced moment easily and immediately acting upon the inner panel 26. This in turn results in quicker deformation of the inner panel 26, quicker deformation of the outer panel 24, and quicker and better absorption of the forces of the impact by these structures, which limits the transfer of the impact forces to other structures of the vehicle and/or the occupants. The inner panel PA, on the other hand, will initially be compressively loaded. Even if provided with a localized initiator (recess or notch), such an inner panel PA will not immediately deform upwardly. Rather, it will initially resist upward deformation and undergo significant compressive loading.

Preferably, the second distance 46, for any given length along the inner panel 26, is defined at a point that is positioned along line 13, which is perpendicular to the longitudinal direction 12. In other words, the bow 42 defines a plurality of second distances 46 relative to the outer panel 24. The locations (second locations) of these second distances 46 define a line 13 that is perpendicular to the longitudinal axis 12 of the vehicle 10. The perpendicular aspect of line 13 promotes the desired predetermined deformation of the hood 14. If the respective positions of the locations defining the second distances 46 were to define a curved line 13, either forward or rearward, the resultant forces on the inner panel 26 would, at least initially, resist deformation.

Figure 6:
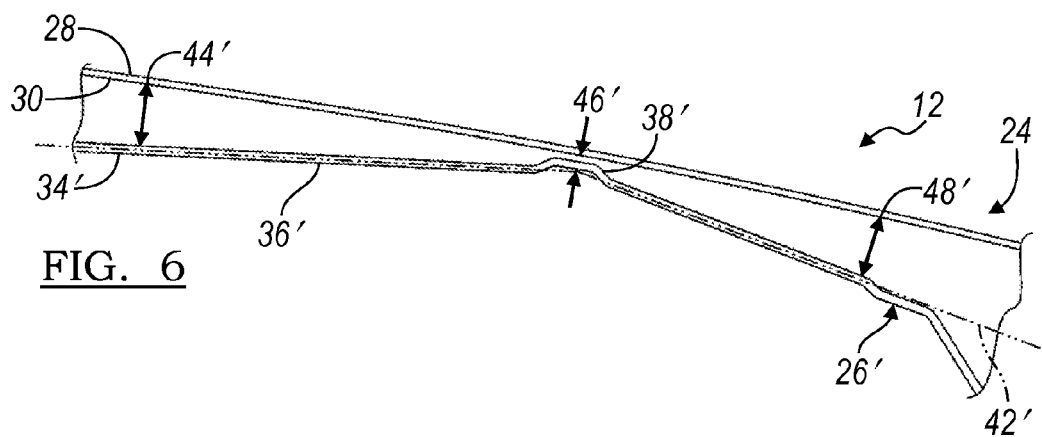
FIG. 6 is a cross sectional view of an additional embodiment of the invention.

As an additional embodiment, seen in FIG. 6, the inner panel 26' is provided with a shallow V-shape 42' instead of the bow 42. In this embodiment, the curved nature of the bow 42, forward and rearward of the location defining the second distance 46, is replaced with a planar or flat configuration. Progressing along a length of the inner panel 26', from left to right (back to front) in FIG. 6, the central portion 34' or rib 36' exhibits a flat, upwardly sloping section that inflects at the location defining the second distance, changing to a flat, downwardly sloping section. While flat and not curved, the shallow V-shape 42' operates in a manner similar to the bow 42 of the embodiment shown in FIG. 4. Reference is therefore made to the prior discussion and need not be reiterated in connection with the present embodiment.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A panel for a vehicle, the panel comprising:
an outer panel defining an exterior surface and an underside surface;
an inner panel located adjacent to and along the underside surface of the outer panel, the inner panel being spaced apart from the outer panel and exhibiting a bow over a substantial portion of its length, the bow being in a direction toward the outer panel, the inner panel including at least one rib extending in a longitudinal direction defined by a length of the vehicle, the rib exhibiting the bow toward the outer panel, and a brace extending perpendicularly to and intersecting with the at least one rib; and whereby the bow induces a moment in the inner panel during impact of the vehicle in a collision that causes the inner panel and resultantly the outer panel to undergo a predetermined deformation in an upward direction relative to the vehicle; and wherein the intersection of the rib and the brace and a centerline of a longitudinal length of the brace are at a location along the rib that defines the shortest distance between the bow and the outer panel.

2. The panel of claim 1, wherein the outer panel and the inner panel cooperate to define a first distance, a second distance and a third distance along a length of the panel, the first distance being defined at a first location toward one end of the inner panel, the second distance being defined at a second location along the inner panel, the third distance being defined at a third location toward the other end of the inner panel, the second location being between the first and third locations and the second distance being less than the first and third distances.

3. The panel of claim 2, wherein the second location is provided in a middle region along the longitudinal length of the inner panel.

4. The panel of claim 3, wherein the bow of the inner panel defines a plurality of second locations, the plurality of second locations being defined along line that is perpendicular to a longitudinal direction defined by the vehicle.

5. The panel of claim 1, wherein the inner panel includes a plurality of ribs extending in the longitudinal direction defined by the vehicle, each of the ribs exhibiting the bow toward the outer panel.

6. The panel of claim 1, wherein the panel is a hood of the vehicle.

7. The panel of claim 1, wherein the predetermined deformation is an inverted V-shape.

8. A panel for a vehicle, the vehicle defining a longitudinal direction, the panel comprising:

an outer panel having an exterior surface and an underside surface;

an inner panel located adjacent to and along the underside surface of the outer panel, the inner panel being spaced apart from the outer panel, the inner panel sloping in the longitudinal direction toward the outer panel from a first location to a second location and sloping away from the outer panel from the second location to a third location, the first and third locations being toward opposite ends of the inner panel, the second location being between the first and third locations, the inner panel having a central portion defined inward of its periphery, the central portion including a plurality of ribs extending in the longitudinal direction and a brace extending perpendicularly to and intersecting with the at least one rib; and whereby the sloping of the inner panel toward the outer panel induces a moment in the inner panel at the second location which, during impact of the vehicle, causes the inner panel and resultantly the outer panel to undergo a predetermined deformation in an upward direction relative to the vehicle; and wherein the intersection of the rib and the brace and a centerline of a longitudinal length of the brace are at a location along the rib that defines the shortest distance between the bow and the outer panel.

9. The panel of claim 8, wherein the sloping of the inner panel toward and away from the outer panel occurs over a substantial portion of a length of the inner panel.

10. The panel of claim 8, wherein the sloping of the inner panel being provided in the central portion and over a majority of a length of the central portion.

11. The panel of claim 10, wherein the sloping of the panel is defined along at least one of the ribs.

12. The panel of claim 11, wherein the sloping of the inner panel is defined along all of the ribs.

13. The panel of claim 8, wherein the sloping of the inner panel is defined by a smoothly curved portion of the inner panel.

14. The panel of claim 8, wherein the sloping of the inner panel is defined by a straight portion of the inner panel.

15. The panel of claim 8, wherein the second location is centrally located along a length of the panel.

16. The panel of claim 8, wherein the panel is a hood of the vehicle.

17. The panel of claim 8, wherein the predetermined deformation is an inverted V-shape.

\* \* \* \* \*